United States Patent
Pak et al.

(10) Patent No.: US 6,792,543 B2
(45) Date of Patent: Sep. 14, 2004

(54) VIRUS SCANNING ON THIN CLIENT DEVICES USING PROGRAMMABLE ASSEMBLY LANGUAGE

(75) Inventors: Michael C. Pak, Portland, OR (US); Victor Kouznetsov, Aloha, OR (US); David W. Palmer, Portland, OR (US)

(73) Assignee: Networks Associates Technology, Inc., Santa Clara, CA (US)

( * ) Notice: Subject to any disclaimer, the term of this patent is extended or adjusted under 35 U.S.C. 154(b) by 516 days.

(21) Appl. No.: 10/006,413

(22) Filed: Nov. 30, 2001

(65) Prior Publication Data

US 2003/0033536 A1 Feb. 13, 2003

Related U.S. Application Data

(63) Continuation-in-part of application No. 09/920,065, filed on Aug. 1, 2001, now Pat. No. 6,718,469.

(51) Int. Cl.$^7$ .............................................. G06F 17/30
(52) U.S. Cl. ...................... 713/200; 713/201; 713/188; 707/200
(58) Field of Search ................................. 713/153, 154, 713/156, 188, 189, 200, 201; 707/10, 100, 102; 705/51, 64

(56) References Cited

U.S. PATENT DOCUMENTS

| | | | | |
|---|---|---|---|---|
| 4,724,521 A | | 2/1988 | Carron et al. .............. 364/300 |
| 5,319,776 A | | 6/1994 | Hile et al. ................. 395/575 |
| 5,440,702 A | | 8/1995 | Brewer et al. ............. 395/375 |
| 5,440,723 A | * | 8/1995 | Arnold et al. .............. 714/2 |
| 5,452,442 A | * | 9/1995 | Kephart ..................... 714/38 |
| 5,832,208 A | * | 11/1998 | Chen et al. ................ 713/201 |
| 5,881,151 A | | 3/1999 | Yamamoto .................... 380/4 |
| 5,914,675 A | | 6/1999 | Tognazzini ................ 340/989 |
| 6,141,681 A | | 10/2000 | Kyle ......................... 709/206 |
| 6,622,150 B1 | * | 9/2003 | Kouznetsov et al. ........ 707/200 |
| 6,718,469 B2 | * | 4/2004 | Pak et al. .................. 713/200 |

FOREIGN PATENT DOCUMENTS

WO         98/45778        10/1998        ........... G06F/11/00

\* cited by examiner

*Primary Examiner*—Ly V. Hua
(74) *Attorney, Agent, or Firm*—Silicon Valley IP Group, PC; Kevin J. Zilka; Christopher J. Hamaty

(57) ABSTRACT

A system, method and article of manufacture are provided for programmable scanning for malicious content on a wireless client device. Initially, an anti-virus program having an instruction set is assembled in a programmable computing language. The anti-virus program is implemented in a wireless client device. A scan for malicious code is performed on the wireless client device utilizing the anti-virus program. A method for programmable scanning for malicious content on a thin client device is also provided. An anti-virus engine is assembled in a programmable computing language. The anti-virus engine is installed on a thin client device. A signature file is also assembled in a programmable computing language, the signature file containing an identifier uniquely identifying a computer virus and a virus detection section comprising object code providing operations to detect the identified computer virus on the thin client device. The signature file is also installed on the thin client device. The anti-virus engine is initiated for scanning for malicious code on the thin client device utilizing the signature file.

24 Claims, 22 Drawing Sheets

170

| Compare verbs | Usage | Description |
|---|---|---|
| find | 67.87% | Declare virus if array of bytes matches what is at the current pointer |
| eliminate | 27.58% | Declare not a virus if array of bytes does not match what is at the current pointer |
| vfind | 12.22% | Same as find, but goes to detection section immediately |
| bufferscan | 11.90% | Search the buffer for an array of bytes. Declare virus if found |
| fuzzyfind | 7.83% | Search for multiple byte arrays in a given block of memory |
| gruntscan | 6.00% | Search for an array of bytes in a given block of memory |

| Seeking verbs | Usage | Description |
|---|---|---|
| skip 1 | 55.71% | Skip pointer ahead N bytes |
| jump jmp | 31.54% | If pointer is 0, jump to the entry point of the EXE. Otherwise, follow jump, branch, or call instruction at pointer. |
| marker2 | 8.91% | Mark the current pointer |
| jump bof | 7.72% | Jump to the beginning of the file |
| jump abs32 | 6.49% | Seek to a given offset into the file |
| jump ifcan | 6.36% | Follow jump, branch, or call instruction at pointer |
| skip −1 | 5.67% | Skip pointer backwards N bytes |
| jump ifx | 5.43% | If the file is EXE format, set pointer to the EXE entry point |
| marker1 | 4.22% | Mark the current pointer |
| jump ne | 4.05% | If the file is NE format, set the pointer to the entry point from the NE file header. Otherwise, fail the jump. |
| gotomarker1 | 3.27% | Jump to the specified marker position |
| gotomarker2 | 3.98% | Move pointer to the stored marker position |
| skip32 | 2.66% | Move pointer forward or back N bytes |

| CRC verbs ┌191 | Usage ┌192 | Description ┌193 |
|---|---|---|
| Pcheck | 14.90% | Declare virus if checksum matches |

| Misc. verbs ┌201 | Usage ┌202 | Description ┌203 |
|---|---|---|
| quitifnotvirus | 17.82% | If no virus flag set yet, quit scanning |
| elimlen | 6.47% | Eliminate file if it isn't at least this long |
| finished | 5.09% | Stop processing the driver now |
| doifnotvirus | 4.83% | Do the next verb is virus flag is off |
| doifverls | 4.60% | Execute next instruction if driver version is less than given value. The next instruction is almost always "finished". |

| Instruction | Description |
|---|---|
| ADD | Add the top two values on the stack and push the result |
| BRANCH | Branch to the given address if the top two stack values match the specified condition |
| CALL | Call the given address, saving the pointer and address to be restored later with a RET instruction |
| CRC | Compute the CRC for a region defined by a list of values on the stack |
| END | Return an identifier for the malware that was detected |
| GOTO | Go to a given address within the script |
| MATCH | Match bytes at pointer against an array of bytes |
| MULT | Multiply the top two values on the stack and push the result |
| PUSH_IMM | Push an immediate value onto the stack |
| PUSH8 | Push the 8bit value at pointer onto the stack |
| PUSH16 | Push the 16bit value at pointer onto the stack |
| PUSH32 | Push the 32bit value at pointer onto the stack |
| RET | Return to the last call instruction and restore the pointer |
| SEEK_EOF | Set the pointer location from the end of file |
| SEEK_REL | Set the pointer location relative to the current pointer |
| SEEK_SET | Set the pointer location to address on the top of the stack |
| SKIM | Move the pointer forward until a matching byte is found |

| Instruction | Param 1 | Param 2 | Param 3 | Param 4 |
|---|---|---|---|---|
| ADD | (POP) | (POP) | (PUSH) | |
| BRANCH | Jump Address | Condition | (POP) | (TOP) |
| CRC | Jump Address | Checksum | Count | (POP Count) |
| END | Value | | | |
| GOTO | Jump Address | | | |
| MATCH | Jump Address | Length | Bytes[Length] | |
| MULT | (POP) | (POP) | (PUSH) | |
| PUSH_IMM | Value | | | |
| PUSH8 | (*PTR) | | | |
| PUSH16 | (*PTR) | | | |
| PUSH32 | (*PTR) | | | |
| RET | | | | |
| SEEK_EOF | (POP) | | | |
| SEEK_REL | (POP) | | | |
| SEEK_SET | (POP) | | | |
| SKIM | Distance | Length | Jump[Length] | Bytes[Length] |

| Instruction | Description |
|---|---|
| SCAN | Specify a process or file to scan |
| EXEC | Specify a plug-in program to execute |

| Byte | Value | Description |
|---|---|---|
| 0, 1 | MATCH | Match bytes at pointer |
| 2, 3 | Address | Address to jump to if there is a match |
| 4, 5 | Length | Address to jump to if there is a match |
| 6...6+Length | Array | Array of bytes to compare against. The bytes at the pointer must match all bytes in the array. |

| Byte | Value | Description |
|---|---|---|
| 0, 1 | SKIM | Find a matching byte at or after the current pointer |
| 2, 3 | Count | Number of bytes to test before giving up |
| 4, 5 | Length | Number of bytes to scan for |
| 6...N | Address | Table of addresses to jump to if there is a match |
| N+1...N+Length+1 | Byte | Array of bytes to scan for NOTE: N = 6+2*Length |

| Byte | Value | Description |
|---|---|---|
| 0, 1 | SEEK +MODE | Seek to a new location in the stream. MODE is one of the following:<br>SEEK SET<br>SEEK EOF<br>SEEK REL |

| Byte | Value | Description |
|---|---|---|
| 0, 1 | PUSH +MODE | Push a value on to the top of the stack. MODE is one of the following:<br>PUSH IMM – immediate value<br>PUSH8 – 8-bits at pointer<br>PUSH16 – 16-bits at pointer<br>PUSH32 – 32-bits at pointer |
| 2, 3 | [Value] | Immediate value pushed onto the stack for PUSH IMM |

| Byte | Value | Description |
|---|---|---|
| 0, 1 | GOTO | Go to the specified address |
| 2, 3 | Address | Address to jump to |

| Byte | Value | Description |
|---|---|---|
| 0, 1 | ADD | Add the top two values on the stack and push the result |

| Byte | Value | Description |
|---|---|---|
| 0, 1 | MULT | Multiply the top two values on the stack and push the result |

| Byte | Value | Description |
|---|---|---|
| 0, 1 | CALL | Call an address, saving the return address and pointer |
| 2, 3 | Address | Address to call |

| Byte | Value | Description |
|---|---|---|
| 0, 1 | RET | Returns from the last call instruction. |

| Byte | Value | Description |
|---|---|---|
| 0, 1 | END | End scanning and declare what malware was discovered |
| 2, 3 | ID | Infection identifier (must not be 0) |

| | Byte | Value | Description |
|---|---|---|---|
| | 0, 1 | CRC | Compute the CRC for the defined region and compare |
| 341 | 2, 3 | Address | Address to jump if CRC matches |
| | 4, 5 | Checksum | The checksum to test against |
| | 6, 7 | Count | Number of values to pop from the stack |

| Delete item verbs | Used | Description |
|---|---|---|
| DTF | 28.8% | Delete this file |
| KILLTROJ | 9.3% | Terminate the process, remove from INI file, remove from registry, and delete the file |
| DELETETHISMACRO | 7.8% | Zero the current macro and remove from the object list |
| DELETEMACRO | 6.9% | Zero the named macro and remove from object list |

| Truncate file verbs | Used | Description |
|---|---|---|
| SHRINK | 23.8% | Shrink the file based on a marker or specified value |
| MENDCOM | 16.8% | Copies memory to start of file, then shrinks file |
| PROCRUSTES | 16.4% | Set desired file size to current pointer for use with a shrink type command |
| UNEXE | 5.9% | Shrink an EXE file, and fix up the SS, SP, IP, and CS values in the header |
| FIXCOMEXE | 5.0% | Combines MENDCOM and UNEXE and auto-detects which file type to fix |
| DELSHR | 4.7% | Delete a range of bytes from the start or middle of the file and shrink the file |

| Copy bytes verbs | Used | Description |
|---|---|---|
| WRITE | 5.5% | Write N bytes from the buffer to the pointer |
| READ | 5.3% | Read N bytes from the pointer into the buffer |

| Misc. verbs | Used | Description |
|---|---|---|
| SKIP | 9.3% | Skip forward or backward in the file N bytes |
| START/END VARIANT | 7.4% | Mark the start and end of a variant identified by a prior CHECK |
| MARKER2 | 6.6% | Save the current pointer – can be used with SHRINK or GOTOMARKER |
| JUMP BOF | 5.7% | Move pointer to the beginning of the file |
| GOTOMARKER2 | 4.7% | Move pointer to the stored marker position |

| Instruction | Description |
|---|---|
| KILL | Kill the current item being scanned |
| CHOP | Remove a region from the file and truncate the file as needed |
| COPY | Copy a region of memory |
| POP8 | Pop a value from the stack and store 8-bits at the pointer |
| POP16 | Pop a value from the stack and store 16-bits at the pointer |
| POP32 | Pop a value from the stack and store 32-bits at the pointer |

391 Instruction
392 Description

| Byte | Value | Description |
|---|---|---|
| 0, 1 | KILL | Kill the current item |
| 2, 3 | Type | Bit field for type of items to kill: Process, file, and message |
| 4, 5 | Length | Number of bytes for the optional name |
| 6...Length | [Name] | Optionally supply a name to lookup and kill |

| Byte | Value | Description |
|------|-------|-------------|
| 0, 1 | CHOP | Remove a region from the file and truncate the file as needed |

| Byte | Value | Description |
|------|-------|-------------|
| 0, 1 | COPY | Copy a region to the current pointer |

| Byte | Value | Description |
|------|-------|-------------|
| 0, 1 | POP+TYPE | Pop the value on the stack to the pointer. TYPE is 8-bit, 16-bit, or 32-bit.<br>POP8<br>POP16<br>POP32 |

| Offset | Bytes | Description |
|---|---|---|
| 0 | 32 | Copyright notice, end with CTRL+Z |
| 32 | 4 | File format version number |
| 36 | 4 | File version number (major, minor, revision, build) |
| 40 | 4 | Date of creation |
| 44 | 4 | Target platform identifier |
| 48 | 4 | Checksum of contents |
| 52 | 4 | Scan section offset |
| 56 | 4 | Name section offset |
| 60 | 4 | Number of entries in name section |
| 64 | 4 | Check section offset |
| 68 | 4 | Number of entries in check section |
| 72 | 4 | Clean section offset |
| 76 | 4 | Number of entries in clean section |

| Offset | Bytes | Description |
|---|---|---|
| 0 | 2 | Length of this entry |
| 2 | 4 | Address of the function to call next |
| 6 | N | ASCIIZ text name of the malware |

Figure 39

VIRUS SCANNING ON THIN CLIENT DEVICES USING PROGRAMMABLE ASSEMBLY LANGUAGE

RELATED APPLICATIONS

This application is a continuation in part of co-pending U.S. patent application entitled "SYSTEM AND METHOD FOR EXECUTING COMPUTER VIRUS DEFINITIONS CONTAINING GENERAL PURPOSE PROGRAMMING LANGUAGE EXTENSIONS," filed Aug. 1, 2001 under Ser. No. 09/920,065 and which is herein incorporated by reference in its entirety now U.S. Pat. No. 6,718,469.

FIELD OF THE INVENTION

The present invention relates to anti-virus protection, and more particularly to a virus detection system in assembly-like code.

BACKGROUND OF THE INVENTION

Computer viruses are executable files or attachments often hidden or disguised as legitimate files or messages. More precisely, computer viruses include any form of self-replicating computer code which can be stored, disseminated, and directly or indirectly executed by unsuspecting clients. Viruses travel between machines over network connections or via infected media and cause malicious and sometimes destructive results. Viruses can be executable program or macro code disguised as application programs, functions, macros, electronic mail attachments, and even applets and hypertext links.

The earliest computer viruses infected boot sectors and files. Over time, computer viruses evolved into numerous types, including cavity, cluster, companion, direct action, encrypting, multipartite, mutating, polymorphic, overwriting, self-garbling, and stealth viruses. Recently, macro viruses have become popular. These viruses are written as scripts in macro programming languages and are attached to documents and electronic mail attachments.

Historically, anti-virus solutions have reflected the sophistication of the viruses being combated. The first anti-virus solutions were stand-alone programs for identifying and disabling viruses. Eventually, anti-virus solutions grew to include special purpose functions and parameterized variables that could be stored in data files read by the anti-virus engine. Over time, the special purpose functions evolved into specialized anti-virus languages for defining virus scanning and cleaning, including removal and disablement, instructions.

The data files store virus definitions. Each virus definition includes object code executed by an anti-virus engine on each client. As new computer viruses are discovered daily, each data file must be periodically updated to add new computer virus definitions, and replace or delete old virus definitions. Over time, data files tend to become large and can take excessive amounts of time to download. Long download times are particularly problematic on low bandwidth connections or in corporate computing environments having a large user base. Data files are also often platform-dependent and updates must be hard-coded into each different type of data file.

Upgrading anti-virus engines in a corporate computing environment can require considerable effort and time. Each anti-virus engine is limited to performing only those operations defined in the associated anti-virus language. Consequently, any changes or extensions to the language typically require the patching or replacement of the engine and can consume considerable resources in debugging and testing. In addition, anti-virus engines are implemented for specific computing environments, generally dependent on the type and version of operating system. Changes or upgrades to an anti-virus engine, therefore, must be propagated across all computing platforms and can present critical portability issues.

One prior art approach avoids the need to patch or replace the anti-virus engine by including the entire engine as part of the data files. Each new virus definition accordingly results in a new engine. However, such an approach to upgrading is slow and bandwidth-intensive. As well, including an anti-virus engine as part of a computer virus definition data file is misleading, as security policies controlling software download and installation are subverted.

Wireless and other thin client devices present further challenges. Typically, anti-virus engines and associated signature files are large making them impractical for storage in the memory of thin client devices. Further, thin client devices typically do not have the computing power of the personal computers and other devices for which traditional anti-virus software is written.

Therefore, there is a need for an approach to providing a flexible and extensible anti-virus solution that avoids the limitations of a special purpose anti-virus language and the limited capabilities of the corresponding anti-virus engine. Preferably, such an approach would provide an anti-virus engine capable of supporting new functionality not originally anticipated.

What is further needed is a methodology for providing such a flexible and extensible anti-virus solution for use on thin client devices, including wireless devices. Further, the solution should include an anti-virus engine and signature file having smaller file sizes and requiring less computing power than existing languages.

Also needed is a way to add new capabilities to a scanning system without requiring bandwidth-intensive and time consuming engine updates.

SUMMARY OF THE INVENTION

A system, method and computer program product are provided for programmable scanning for malicious content on a wireless client device. Initially, an anti-virus program having an instruction set is assembled in a programmable assembly-like computing language. The anti-virus program is implemented in a wireless client device. A scan for malicious code is performed on the wireless client device utilizing the anti-virus program. Note that this can include scanning a memory of the device as well as an inbound or outbound data stream traversing a communication port of the client device.

Some benefits of using programmable assembly-like code for anti-virus scanning include its flexibility, speed and size, as will become apparent upon a reading of the description that follows. Assembly-like anti-virus detection language is highly efficient, in both performance and size, compared to traditional detection languages. Because the engine executes on a simple yet highly programmable instruction set, it is smaller and faster. Further, the virus signature file can be potentially smaller since it contains compiled/interpreted code from assembly source, not a high-level script or programming language such as C. The size can be further reduced by merging scan information for multiple types of malicious code. Instead of containing instructions such as "look for virus x for each X," scanning according to one embodiment is performed using an instruction such as "Look for all patterns in X, and declare x if found." This helps by eliminating non-infected files quickly and reduces size requirements by merging the signature information.

According to one embodiment, the simpler instruction set in the programmable assembly-like computing language are based on instructions from an existing anti-virus program (which includes any engine and/or signature file for detecting any type of malicious code). Preferably signature information of the pre-existing anti-virus program is merged into a single instruction in the programmable assembly-like computing language. By providing a less-complex scan engine and providing functionality via the signature file, flexibility is enhanced, which is ideal for wireless applications.

According to another embodiment, the instruction set is capable of implementing the functionality of a Discrete Finite Automation (DFA) in a programmable assembly-like computing language. This allows detection of multiple viruses at the same time without having to scan for them individually. In such an embodiment, the machine begins with a pointer into the input stream and a start state. Based on what byte is found at the pointer, the machine moves to a specified state. For each transition, the pointer is moved forward to the next byte. The machine ends with a stop state that identifies which infection was identified or none. The DFA's for several types of malicious code can be combined into a single DFA that scans for all such types of malicious code at the same time.

The wireless client device can be a wireless telephone, a personal digital assistant, a handheld computer including a Blackberry-type device or PocketPC, a pager, etc. The instruction set preferably includes instructions for cleaning infected data. Such instructions can include instructions for deleting an item, truncating a file, copying bytes from one location to another, and/or overwriting bytes in a stream. The anti-virus program includes a signature file used by an anti-virus engine to identify malicious code. The signature file is preferably compiled utilizing the programmable assembly-like computing language. This allows the signature file to be smaller than it would be if the signature file were compiled from C. Preferably, the signature file includes an identifier uniquely identifying an instance of malicious code, a malicious code detection section comprising object code providing operations to detect the identified computer virus in the wireless client device, and an extension sentence comprising object code providing reusable operations implemented in the programmable assembly-like computing language.

A method for programmable scanning for malicious content on a thin client device is also provided. An anti-virus engine is assembled in a programmable computing language. The anti-virus engine is installed on a thin client device. A signature file is also assembled in a programmable computing language, the signature file containing an identifier uniquely identifying a computer virus and a virus detection section comprising object code providing operations to detect the identified computer virus on the thin client device. The signature file is also installed on the thin client device. The anti-virus engine is initiated for scanning for malicious code on the thin client device utilizing the signature file.

In one embodiment, an extension sentence is added to the signature file. The extension sentence includes object code providing reusable operations implemented in the programmable computing language. In another embodiment, the anti-virus engine utilizes discrete function automation for pattern matching. Preferably, discrete function automations for several types of malicious code are combined in a single discrete function automation for scanning for the types of malicious code simultaneously. The thin client device can be a wireless telephone, a personal digital assistant, a handheld computer, a pager, etc. The signature file preferably includes instructions for cleaning infected data. Such instructions can include instructions for deleting an item, truncating a file, copying bytes from one location to another, and/or overwriting bytes in a stream.

BRIEF DESCRIPTION OF THE DRAWINGS

FIG. 11 sets forth verbs used to compare virus identification data to information on the client device.

FIG. 12 lists seeking verbs that can be used during scanning.

FIG. 13 lists a CRC verb that can be used during scanning.

FIG. 14 sets forth miscellaneous verbs that can be used during scanning.

FIG. 15 is a listing several illustrative instructions for an anti-virus engine according to one embodiment.

FIG. 16 is a table listing parameters of the instructions listed in the table of FIG. 15.

FIG. 17 is a table listing additional instructions for an anti-virus engine and descriptions.

FIG. 18 shows a table describing the MATCH instruction.

FIG. 19 shows a table describing the SKIM instruction.

FIG. 20 illustrates a table describing the SEEK instruction.

FIG. 21 depicts a table describing the PUSH instruction.

FIG. 22 illustrates a table describing the GOTO instruction.

FIG. 23 depicts a table describing the ADD instruction.

FIG. 24 shows a table describing the MULT instruction.

FIG. 25 illustrates a table describing the CALL instruction.

FIG. 26 illustrates a table describing the RET instruction.

FIG. 27 depicts a table describing the END instruction.

FIG. 28 shows a table describing the CRC instruction.

FIG. 29 sets forth verbs used to delete items.

FIG. 30 lists truncate file verbs.

FIG. 31 lists a copy byte verb.

FIG. 32 sets forth miscellaneous verbs.

FIG. 33 is a table listing several illustrative instructions.

FIG. 34 shows a table describing the KILL instruction.

FIG. 35 shows a table describing the CHOP instruction.

FIG. 36 shows a table describing the COPY instruction.

FIG. 37 shows a table describing the POP instruction.

FIG. 38 depicts a table setting forth elements of a file header.

FIG. 39 shows a table having elements of the name section of a file.

DESCRIPTION OF THE PREFERRED EMBODIMENTS

Figure 1:
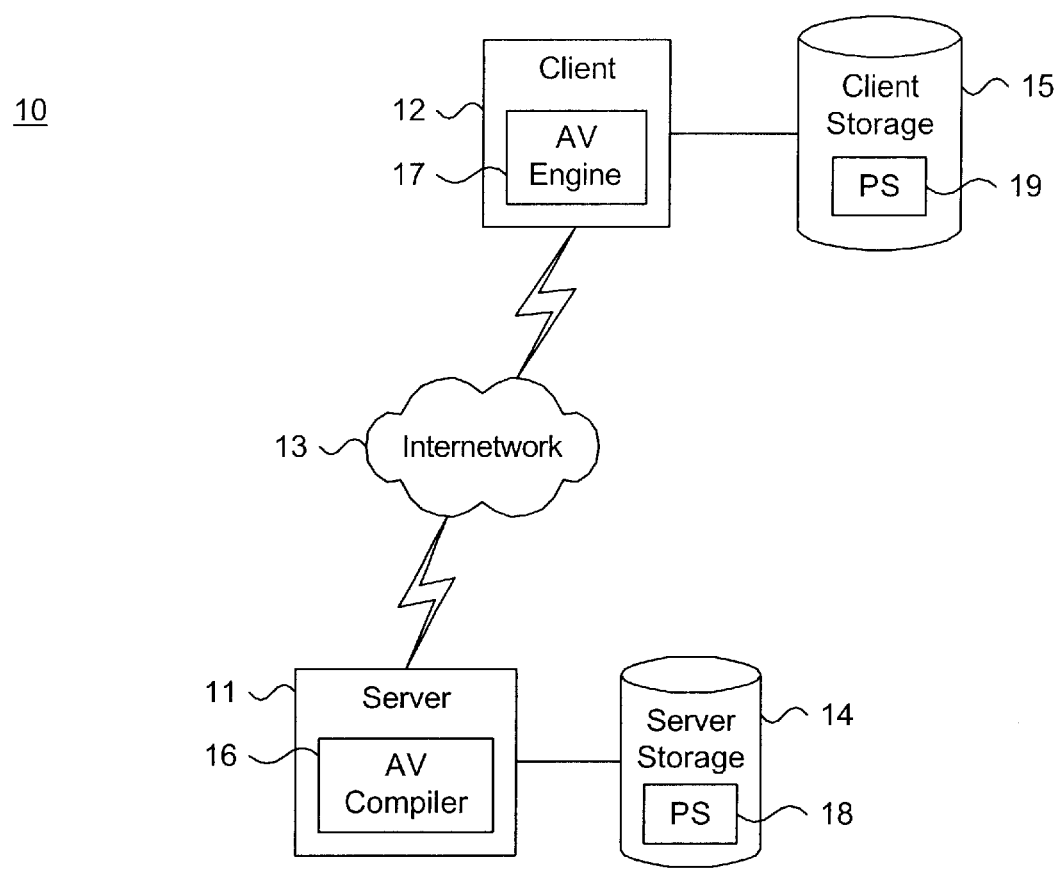
FIG. 1 is a block diagram showing a networked computing environment, including a system for executing computer virus definitions containing general purpose programming language extensions, in accordance with the present invention.

FIG. 1 is a block diagram showing a networked computing environment 10, including a system for executing computer virus definitions containing general purpose programming language extensions, in accordance with the present invention. The networked computing environment 10 includes a server 11 interconnected to a client 12 via an internetwork 13. The server 11 provides client services, such as information retrieval and file service. Alternatively, the interconnection could be with a direct connection, over a dialup connection, via an intranetwork, a wireless link, or by a combination of the foregoing or with various other network configurations and topologies, as would be recognized by one skilled in the art.

The server 11 includes a persistent store 18 maintained on a server storage device 14. Individual directories, files, and databases are stored under the file system 18. Suitable persistent storage devices include randomly accessible devices, such as hard drives and rewriteable media, although other forms of persistent storage devices could also be used by or incorporated into the server 11. Similarly, the client 12 also includes a persistent store 19 maintained on a client storage device 15.

The client 12 can potentially be exposed to computer viruses by virtue of having interconnectivity with outside machines. As protection, the client 12 includes an anti-virus (AV) engine 17 that executes operations to scan for the presence of and to clean off computer viruses, particularly as found in the persistent store. An exemplary anti-virus engine 17 is the VirusScan® product, licensed by Networks Associates®. As further described below beginning with reference to FIG. 2, the anti-virus engine 17 reads in a data file stored in the persistent store containing virus definitions and object code for the anti-virus engine 17 to identify and remove computer viruses. Each data file also includes object code compiled from a general purpose programming language.

The computer virus data files must be periodically updated with new computer virus definitions and code to enable the anti-virus engine 17 to continue to provide up-to-date anti-virus protection. Thus, the server 11 includes an anti-virus (AV) compiler 16 that executes an updating service. The client 12 can connect to the server 11 and download updated external virus definition files from the anti-virus compiler 16 for subsequent incorporation into a structured virus database.

The individual computer systems, including server 11 and client 12, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
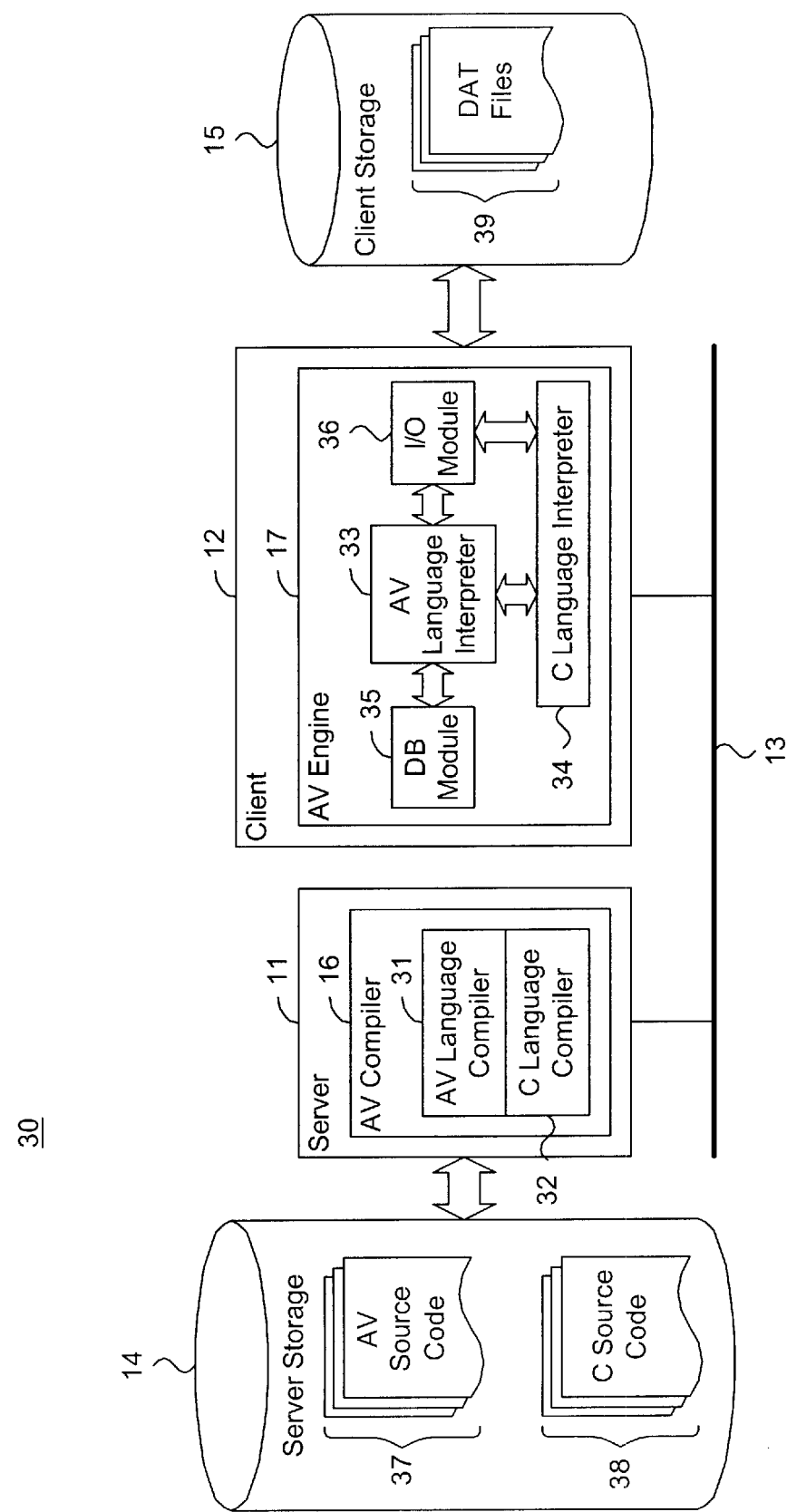
FIG. 2 is a block diagram showing a system for executing computer virus definitions containing general purpose programming language extensions.

FIG. 2 is a block diagram showing a system 30 for executing computer virus definitions containing general purpose programming language extensions. The system 30 includes the server 11 and client 12 with persistent storage devices. The server 11 executes an anti-virus compiler 16 that is used to generate the DAT files 39 from anti-virus (AV) source code 37 and C source code 38. The client 12 executes an anti-virus engine 17 and periodically interfaces to the server 11 over the internetwork 13, or other such form of interconnection, to receive anti-virus data (DAT) file 39 updates. The anti-virus engine 17 scans and cleans files and attachments stored in the client storage 15.

The anti-virus engine 17 consists of four functional modules: anti-virus (AV) language interpreter 33, C language interpreter 34, database (DB) module 35 and input/output (P/O) module 36. Each DAT file 39 includes virus definitions and anti-virus object code plus object code for one or more extensions written in a general purpose programming language, such as a C programming language as used in the described embodiment.

The anti-virus language interpreter 33 reads the anti-virus object code in each DAT file 39 and interprets the operations encoded therein. The anti-virus operations include instructions for identifying and removing or neutralizing computer viruses infecting the files or attachments stored in the client storage 15. The anti-virus language interpreter 33 is limited to performing those operations specified by the anti-virus language. Therefore, the utility of the anti-virus engine 17 is constrained by the flexibility of the anti-virus language interpreter 33.

The C language interpreter 34 removes the restrictions implicit in the anti-virus language by allowing the anti-virus engine 17 to execute extensions implemented in a general purpose programming language. In the described embodiment, the extensions are implemented in the C programming language, although one skilled in the art would recognize that other general purpose programming languages could also be used.

The individual DAT files 39 are organized into a structured storage scheme that is accessed via the database module 35. The file system of the client storage 15 is accessed via the input/output module 36 which retrieves target files and attachments for examination by the anti-virus language interpreter 33 and C language interpreter 34.

The anti-virus compiler 16 consists of two functional modules: anti-virus (AV) language compiler 31 and C language compiler 32. The anti-virus language compiler 31 reads in anti-virus source code 37 stored in the server storage 14. Individual segments of C source code 38 can be included within the anti-virus source code 37 for compilation by the C language compiler 32. Each embedded C language source C segment is delimited within the anti-virus source code 37 using standardized keywords, as further described below with reference to FIG. 3.

Each module is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The anti-virus compiler 16 and the anti-virus engine 17 operate in accordance with a sequence of process steps, as further described below with reference to FIGS. 7 and 8, respectively.

Figure 3:
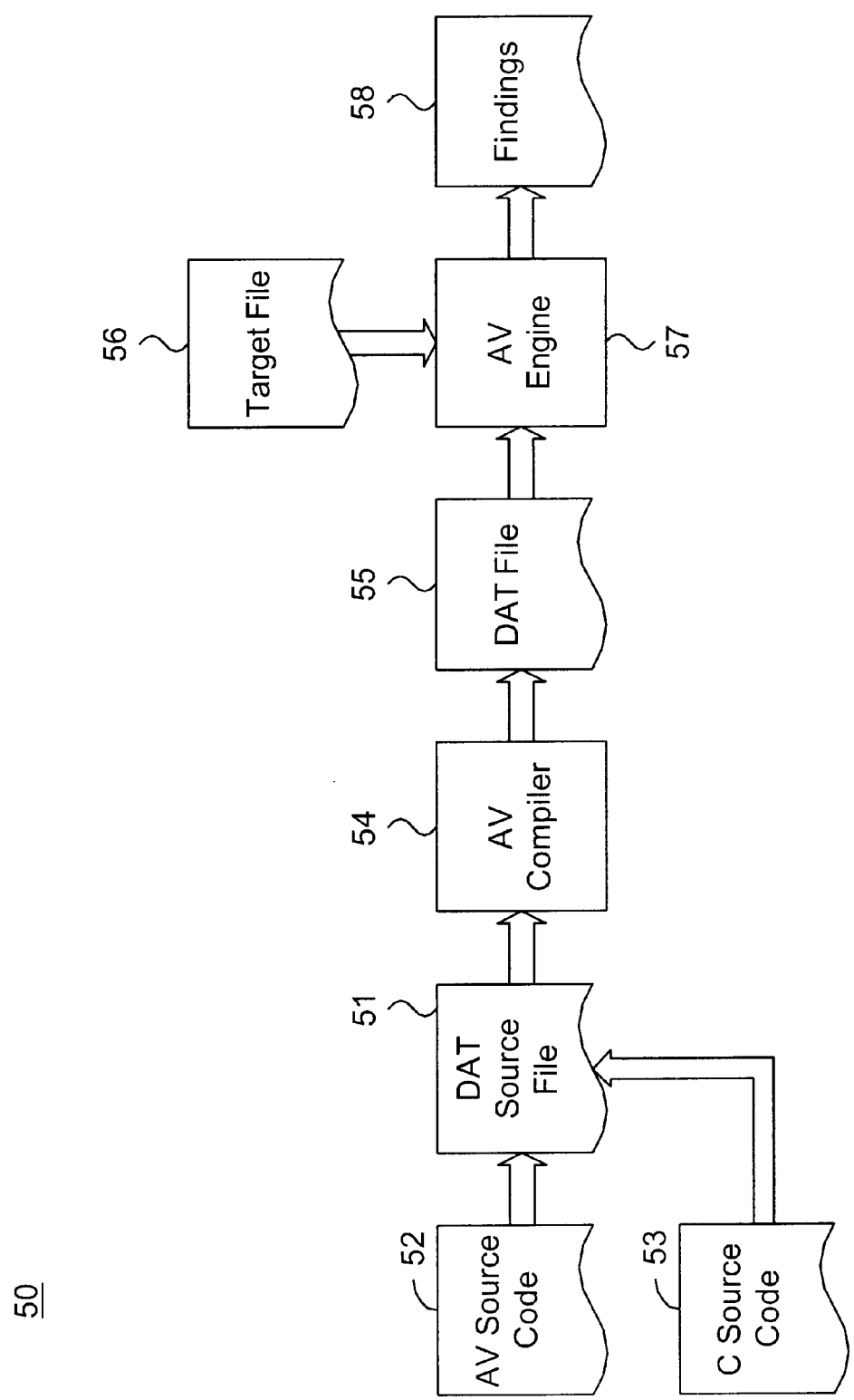
FIG. 3 is a process diagram showing, by way of example, the compilation and use of computer virus DAT files.

FIG. 3 is a process diagram 50 showing, by way of example, the compilation and use of computer virus DAT files. Each DAT file 55 is generated from a DAT source file 51. The DAT source file 51 contains anti-virus source code 52 and C source code 53. The AV source code 52 specifies instructions written in the anti-virus language supported by the anti-virus engine 57 for identifying and removing known computer viruses. The set of instructions for each virus is known as a "driver." The C language source code 53 includes instructions written, for example, in the C programming language for augmenting the functionality of the anti-virus engine 57 to allow other forms of virus detection and correction, particularly those exceeding the inherent capabilities of the anti-virus engine 57. To support general purpose programming language extensions, the grammar of the anti-virus language used in the described embodiment has been extended to include several new verbs as follows:

cbegin, cend: All C source code is delimited between these two verbs and no anti-virus language verbs are allowed between cbegin and cend.

crunlimit<hex value>: This verb limits the number of bytecode instructions to execute to <hex value>. If this verb is not present, the default value (0xFFFFFFFF/2) is used. This verb must be used before the cbegin and cend pair.

cifeggoto<hex value><label>: This verb tests the return value of the main function. If the return result is equal to <value> jump to<label>.

cifneggoto<hex value><label>: This verb also tests the return value of the main function. If the return result is not equal to <value> jump to<label>. Note: <label> must be explicitly declared with a corresponding target verb.

ccall<driver name>: This verb executes the main( ) routine of a C library for the identified <driver name> and can be applied repeatedly to maximize code reuse.

The anti-virus compiler 54 compiles the DAT source file 51 into a DAT file 55. The C language source code 53 is delimited from the anti-virus source code 52 and, upon encountering a delimiter, the anti-virus compiler 54 will preprocess and mark the C source code 53 for compilation using the C compiler 32 (shown in FIG. 2).

In the described embodiment, the C compiler 32 is based on the Micro-C compiler described in D. R. Hanson, et al., "A Retargetable C Compiler: Design and Implementation," Addison-Wesley (1995), the disclosure of which is incorporated by reference. The Micro-C compiler supports the entire C language syntax but does not include a link editor. Consequently, the anti-virus compiler 54 provides the necessary link editing functionality.

As implemented, the C compiler 32 supports reusable object code that can be consolidated into libraries for use by multiple anti-virus drivers. Through code re-use, C language functions can be invoked from anti-virus language calls or from other C language functions. C language code can also be reused in other C language functions by including function prototypes. The anti-virus compiler 54 links the additional functions during compilation. In addition, the C language functions can be nested and can store and return values and data structures.

The C compiler 32 also supports emulator callbacks. These allow the anti-virus engine 17 (shown in FIG. 1) to handle interrupts and exceptions and platform-specific application programming interface calls.

On the client end, the anti-virus engine 57 receives and reads a DAT file 55. A target file (or attachment) 56 is retrieved and examined for the presence of a computer virus using the virus definitions embedded into the DAT file 55. Any findings 58 are communicated back to the user.

By way of example, an anti-virus language script including an embedded C language segment is shown below:

name nvirus qhit excel "X97M/Dummy"; does nothing noquick crunlimit 100 cbegin int main (void) {return 1;} cend cifeggoto 1 "TRUE"

find 03 04; never executed target "TRUE"

bufferseek "dummy"

remove check "" 2b6 209 xchec deleteexcelmacro "dummy"

end

As shown, the example anti-virus script will search for a fictitious macro virus called "X97M/Dummy" for Microsoft Excel spreadsheets. The actual C language extension consists of a one-line program "int main (void) {return 1;}." The remainder of the script supports the processing of the return value of the C language segment and removal of the "virus."

Figure 4:
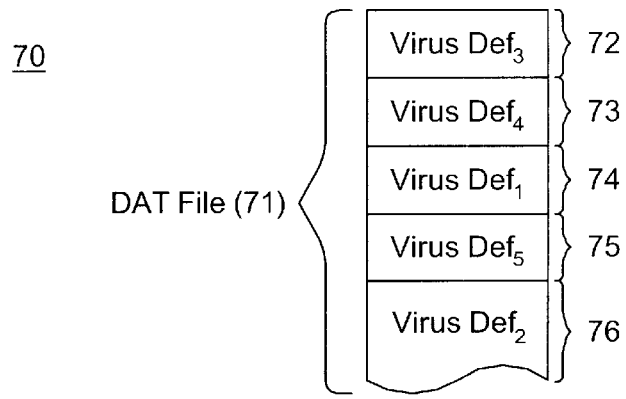
FIG. 4 is a block diagram showing the format of a computer virus DAT file for use by the anti-virus engine of FIG. 2.

FIG. 4 is a block diagram showing the format 70 of a computer virus DAT file 71 for use by the anti-virus engine 17 of FIG. 2. Each DAT file 71 stores individual virus definitions 72–76 using an ordering optimized for speed in virus scanning. In the described embodiment, each DAT file 71 consists of three individual virus definition sets: scan, clean, and names, although these sets can be logically viewed as a single consolidated file. The individual virus definitions 71–76 are ordered within the DAT file 71 for optimal retrieval. Thus, the DAT file 71 stores the virus definitions 72–76, for example, in order of third, fourth, first, fifth and second viruses. Other orderings or forms of organization are feasible.

Figure 5:
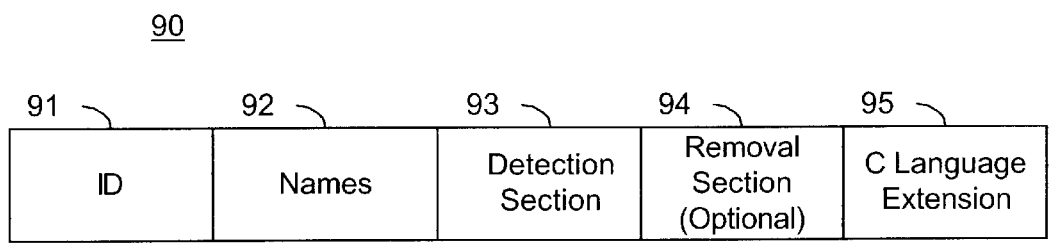
FIG. 5 is a block diagram showing the format of a virus definition record as stored in the virus definitions of FIG. 4.

FIG. 5 is a block diagram showing the format of a virus definition record 90 as stored in the virus definitions 72–76 of FIG. 4. Each record 90 consists of 5 fields: identifier (ID) 91, names 92, detection section 93, an optional removal section 94, and C language extension 95. The identifier field 91 uniquely identifies the computer virus described by the record 90. The names field 92 contains at least one virus name associated with the computer virus. The detection section 93 stores object code that provides operations written in the anti-virus language to detect the computer virus within the file or attachment being scanned. The virus removal section 94 is optional and stores object code written in the anti-virus language providing operations to clean the identified computer virus from the scanned machine. Alternatively, the virus removal section 94 could contain a null operation, such as when no action need be taken to address the presence of a virus. Finally, the C language extension 95 stores object code written, by way of example, in the C programming language providing operations to identify, clean or both the computer virus. Other organizations and record formats could also be used. In addition, one skilled in the art would recognize that the use of the C programming language is merely illustrative and not meant to be limitative. Other general purpose programming languages could also be used.

Figure 6:
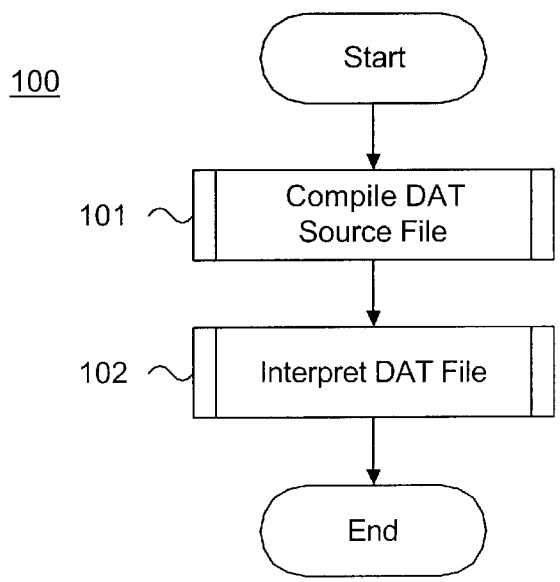
FIG. 6 is a flow diagram showing a method for executing computer virus definitions containing general purpose programming language extensions in accordance with the present invention.

FIG. 6 is a flow diagram showing a method for executing computer virus definitions containing general purpose programming language extensions 100 in accordance with the present invention. The method logically starts with the operations performed by the server 11 (block 101) and client (block 102), as further described below with reference to FIGS. 7 and 8, respectively. In practice, the server 11 and client 12 operate independently without express synchronization or coordination. However, both systems must be operating to perform a complete virus identification and removal procedure.

Figure 7:
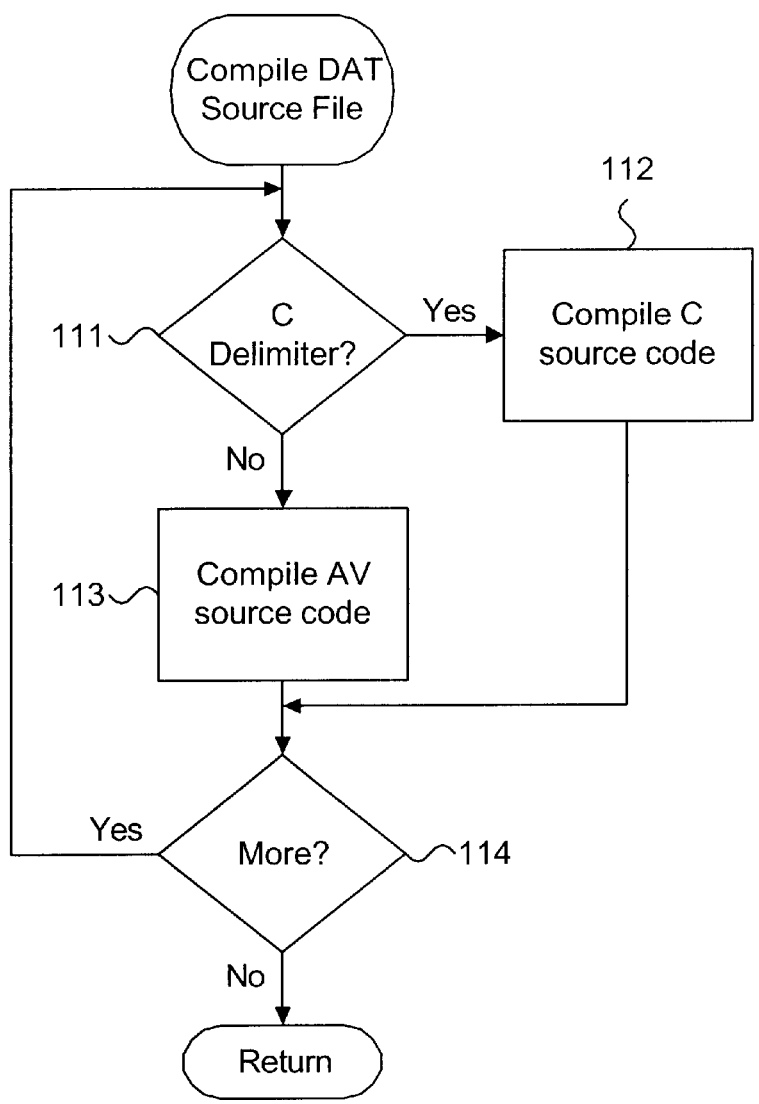
FIG. 7 is a flow diagram showing a routine for compiling a DAT file for use in the method of FIG. 6.

FIG. 7 is a flow diagram showing a routine 110 for compiling a DAT file 55 (shown in FIG. 3) for use in the method of FIG. 6. The purpose of this routine is to identify any embedded C language extensions for appropriate compilation.

Thus, if the anti-virus compiler 54 (shown in FIG. 3) encounters a delimiter in the DAT source file 51, that is, cbegin (block 111), the C source code 53 is compiled using the C language compiler 32 (shown in FIG. 2) (block 112) to generate object code. In the described embodiment, the verbs cbegin and cend respectively delimit the beginning and ending of C source code.

Otherwise, if standard anti-virus language source code is encountered (block 111), the anti-virus source code 52 is compiled by the anti-virus language compiler 31 (block 113). The line-by-line compilation of the DAT source file 51 continues while more source code is found (block 114), after which the routine returns.

Figure 8:
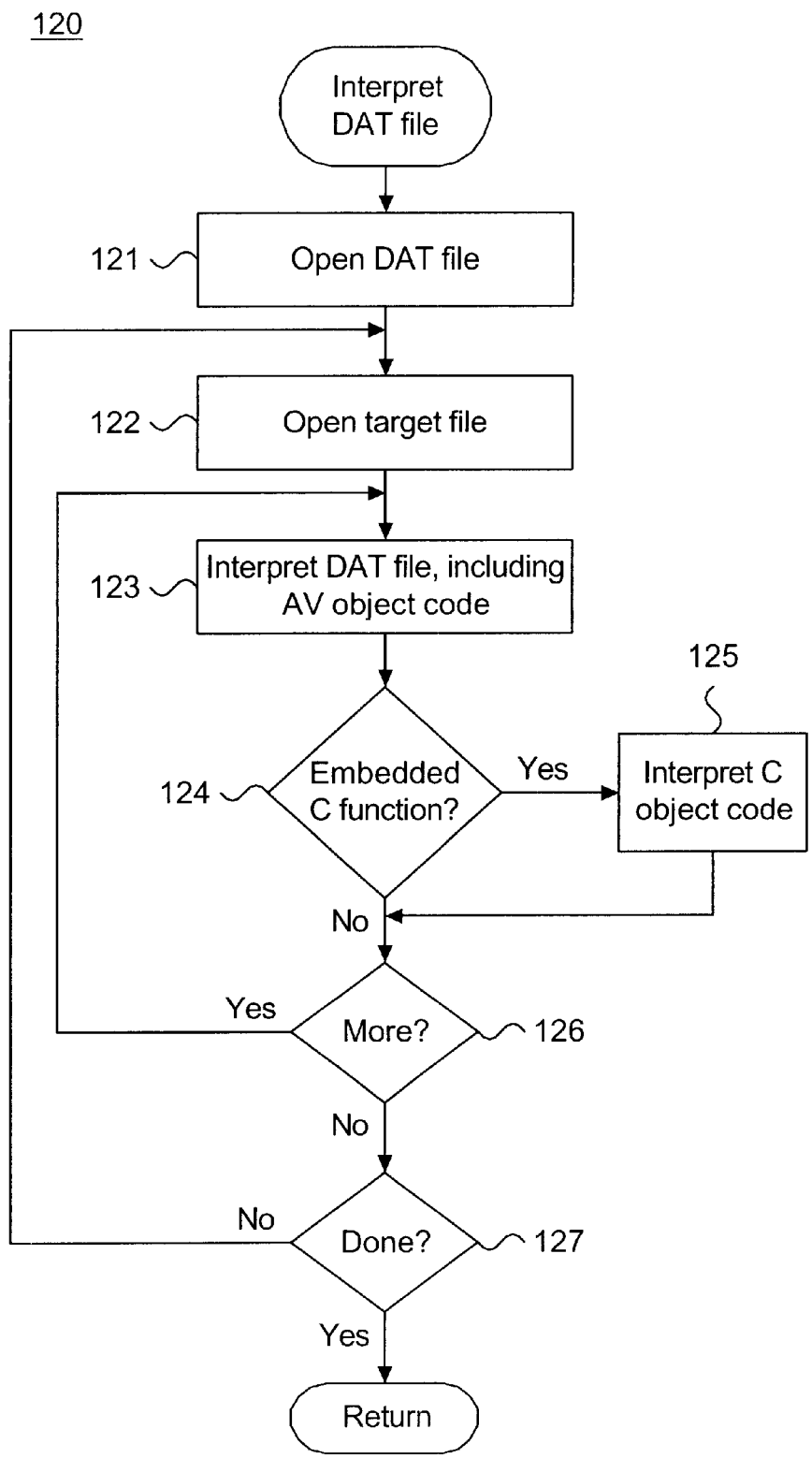
FIG. 8 is a flow diagram showing a method for interpreting a DAT file for use in the method of FIG. 6.

FIG. 8 is a flow diagram showing a method for interpreting a DAT file 55 (shown in FIG. 3) for use in the method of FIG. 6. The purpose of this routine is to interpret both anti-virus and C object code to identify and disable computer viruses in a target file or attachment.

Thus, a DAT file 55 is opened by the AV engine 57 (block 121). The target file (or attachment) is opened (block 122) and the DAT file 55 is interpreted by the AV engine 57, including any AV object code encountered therein (block 123). If an embedded C language function is encountered (block 124), the C language object code is interpreted by the C language interpreter 34 (shown in FIG. 2) (block 125). The interpretation of the DAT file 55 continues, while more object code in the DAT file 55 remains (block 126). Processing continues (blocks 122–126) while the anti-virus engine 57 completes all target files and attachments (block 127). The routine then returns.

For thin client devices such as personal digital assistants (PDAs), handheld computers including Blackberry-type devices or PocketPCs, wireless telephones, pagers, etc., use of a C-like language for detection can be used. However, using a C-like language for virus detection requires a runtime environment that may be too large for many such thin client devices. This is because the program is written in C (or other high-level script or programming language). The C code becomes assembly code. The assembly code becomes machine code. The problem is that even a few lines of C code results in many lines of machine code, requiring a substantial amount of processing power and memory.

Thus, for thin client devices, it is preferable to use assembly-like code to avoid the bulky translation of C or a batch file to machine code. Some benefits of using an assembly-like code for anti-virus scanning include its flexibility, speed and size, as will become apparent upon a reading of the description that follows.

Assembly-like anti-virus detection language is highly efficient, in both performance and size, compared to traditional detection languages, as very optimized code can be written. Because the engine executes on a simple yet highly programmable instruction set, it is smaller and faster. The assembly-like language is preferably more of a RISC architecture instead of the old CISC approach. Thus new capabilities can be added by a signature file update without needing to update the scan engine. This programmability is important, as to add a new instruction to prior art anti-virus engines, one was required to code the new instruction into a new engine and replace the old engine (not just a new DAT). Now, rather than having to install a new anti-virus engine each time a detection method changes, new instructions can be placed inside the DAT file, as described above, except that the additional instructions are written in the assembly-like code.

Further, the virus signature file can be potentially smaller since it contains compiled/interpreted code from assembly source, not C or other high-level script or programming language. The size can be further reduced by merging scan information for multiple types of malicious code. Instead of containing instructions such as "look for virus x for each X," scanning according to one embodiment is performed using an instruction such as "Look for all patterns in X, and declare x if found." This helps by eliminating non-infected files quickly and reduces size requirements by merging the signature information.

Further, such an anti-virus detection system can use a full set of commonly used instructions such as adding number, different locations, and conditionals. And because the system can use the full set of instructions, it is very robust. Thus, without requiring the engine to change, a very small virus detection program can be written.

Figure 9:
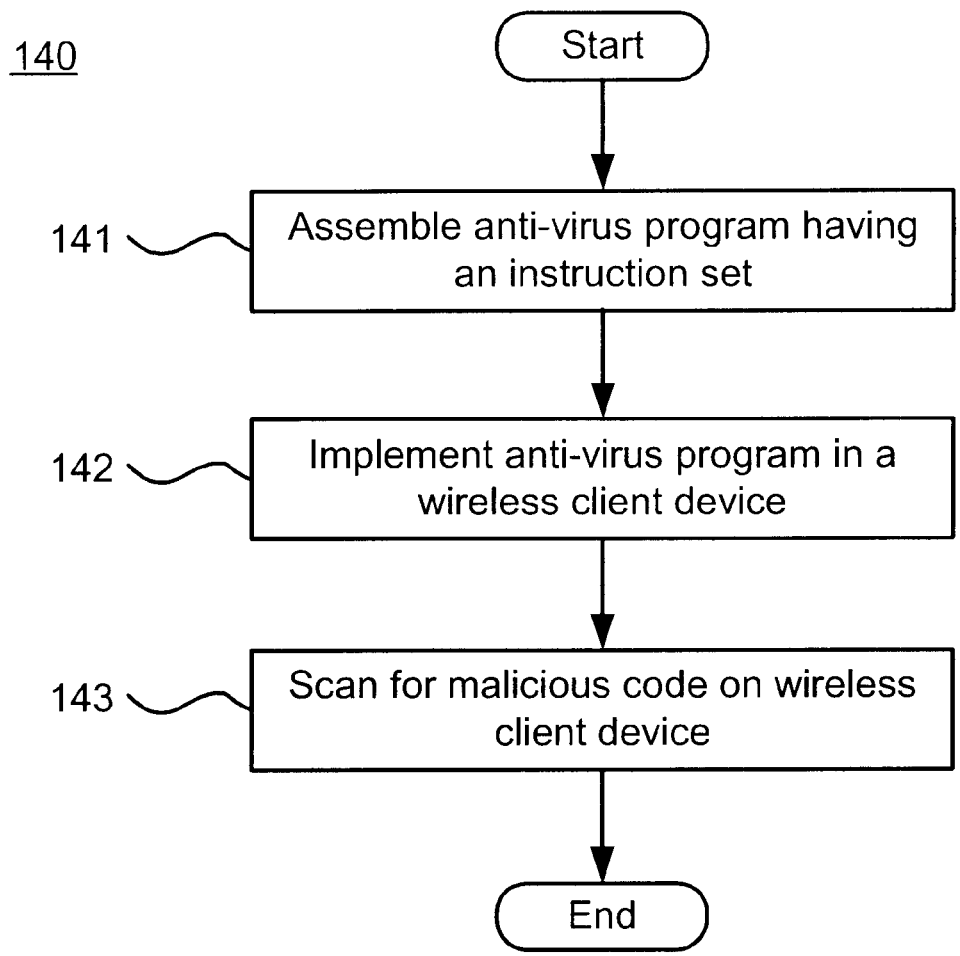
FIG. 9 illustrates a process for programmable scanning for malicious content on a wireless device.

FIG. 9 illustrates a process 140 for programmable scanning for malicious content. Initially, an anti-virus program having an instruction set is assembled in a programmable assembly-like computing language (block 141).

The anti-virus program includes an anti-virus engine and a signature file used by the anti-virus engine to identify malicious code. Both the engine and signature file are preferably compiled in the programmable assembly-like computing language. This allows the engine to be more efficient. This also allows the signature file to be smaller than it would be if the signature file were compiled from C. Preferably, the signature file includes an identifier uniquely identifying an instance of malicious code, a malicious code detection section comprising object code providing operations to detect the identified computer virus in the wireless client device, and an extension sentence comprising object code providing reusable operations implemented in the programmable assembly-like computing language. This feature allows new functionality to be added to the engine without requiring replacing the engine.

The anti-virus program is implemented (installed) in a wireless client device (block 142). A scan for malicious code is performed on the wireless client device utilizing the anti-virus program (block 143). Note that this can include scanning a memory of the device as well as an inbound or outbound data stream traversing a communication port of the client device.

Figure 10:
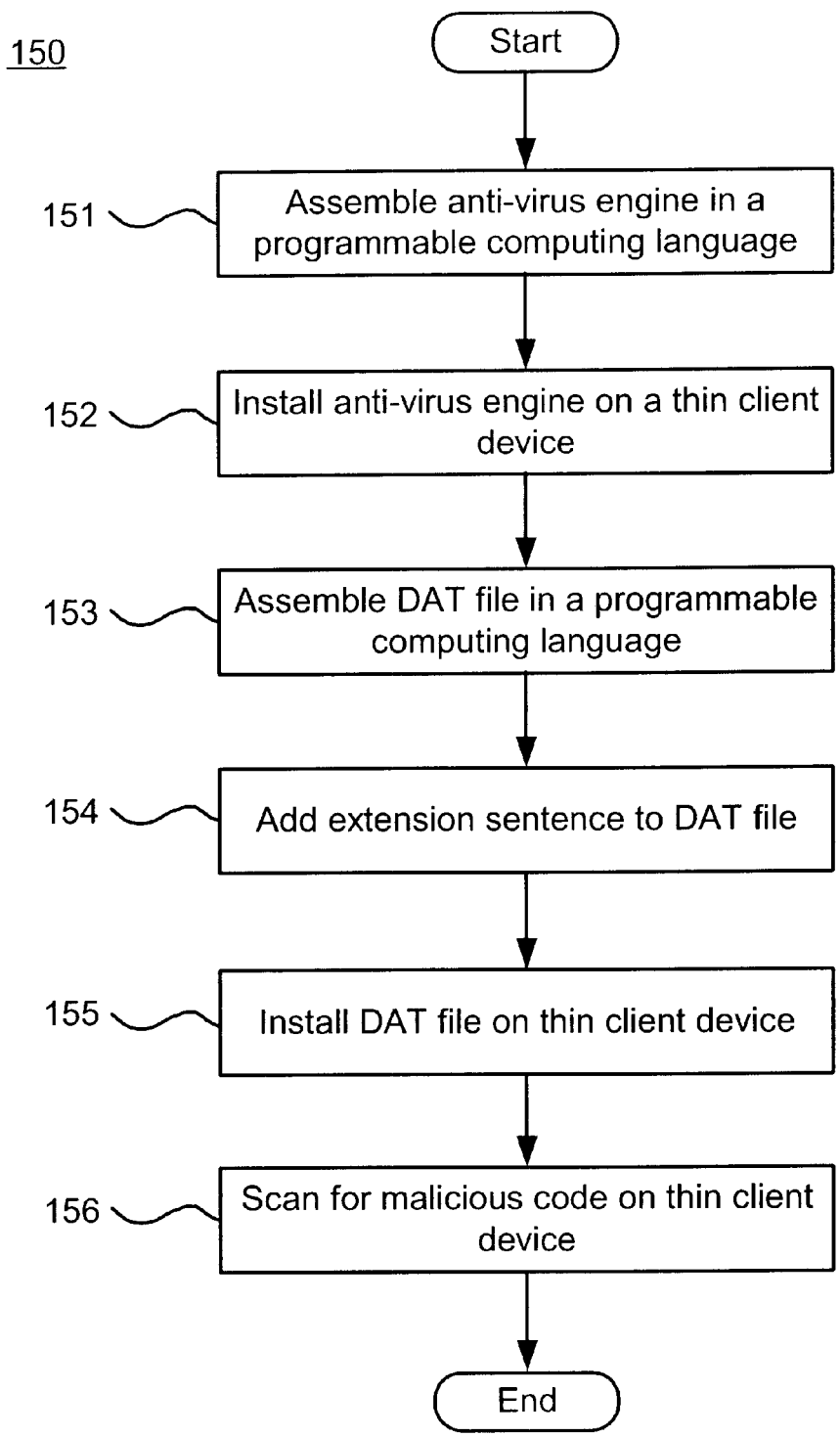
FIG. 10 depicts a process for programmable scanning for malicious content on a thin client device.

FIG. 10 depicts a process 150 for programmable scanning for malicious content according to one embodiment. An anti-virus engine is assembled in a programmable computing language (block 151). The anti-virus engine is installed on a thin client device (block 152).

A signature file (DAT file) is also assembled in a programmable computing language (block 153). The signature file contains an identifier uniquely identifying a computer virus and a virus detection section comprising object code providing operations to detect the identified computer virus on the thin client device. An extension sentence is added to the signature file (block 154). The extension sentence includes object code providing reusable operations implemented in the programmable computing language. Such operations can include instructions for cleaning infected data by deleting an item, truncating a file, copying bytes from one location to another, and/or overwriting bytes in a stream. The signature file is also installed on the thin client device (block 155). The anti-virus engine is initiated for scanning for malicious code on the thin client device utilizing the signature file (block 156).

Again, the anti-virus engine can use discrete function automation for pattern matching. Discrete function automations for several types of malicious code can be combined in a single discrete function automation for scanning for multiple types of malicious code simultaneously.

When writing and/or compiling the code for the anti-virus engine, assembly language (human readable form) is translated to machine code in an assembly-like language. This provides a small engine/runtime environment to execute on small instructions. The footprint required to run this type of code is smaller and faster.

One embodiment proposes the use of a programmable instruction set for anti-virus scanning. The simpler instruction set in the programmnable assembly-like computing language can be based on instructions from a pre-existing anti-virus program. For example, commonly used instructions for virus detection are:

GOTO location A

FIND a pattern of bytes

For a thin client device, the two instructions listed immediately above would be programmed in assembly-like language. Preferably the, functionality of multiple instructions of the pre-existing anti-virus program is merged into a single instruction in the programmable assembly-like computing language. By providing a less-complex scan engine and providing functionality via the signature file, flexibility is enhanced, which is ideal for wireless applications.

To create a DAT-type signature file, a DAT file can be generated in a standard way (such as by using VIRTRAN). An interpreter then converts the language for the particular language being used. This way, researchers don't need to use two different toolsets. The DAT file can also be written in straight assembly-like language with commonly-used virus detection instructions embedded therein.

Following is a list of verbs that can be used during scanning.

TABLE 1

1. verb to get to the code entry point
2. [v] find
3. skip
4. eliminate/elimif/elimuness/elimifnotascii
5. [v] fuzzyfind
6. [v] gruntscan
7. quitifvirus
8. quitifnotvirus
9. [p] check
10. [goto] marker #
11. [v] seqfuzzyfind
12. jump bof/eof/section # (file dependent)
13. buffergoto/bufferscan/bufferseek
14. elimlen
15. doiffind
16. doifnotfind
17. doifverls/ifvergegoto
18. loadfilter
19. loadbuffer
20. findbit
21. ifvirusgoto/doifnotvirus FIGS. 11–14 are tables 170, 180, 190, 200 listing several exemplary verbs that can be used during scanning. More particularly, FIG. 11 sets forth verbs used to compare virus identification data to information on the client device (column 171). FIG. 12 lists seeking verbs (column 181), FIG. 13 lists a CRC verb (column 191) and FIG. 14 sets forth miscellaneous verbs (column 201). These verbs can be selected by counting the frequency for which each verb was used in a driver for more powerful computers. Verb occurrences are preferably counted only once per driver. Short drivers consisting of only two verbs or less can be ignored, as they may call "check" and might throw off the statistics for useful drivers. Verbs for emulating the processor may or may not be considered. Columns 172, 182, 192, 202 each list percentages representing the frequency of verb occurrences. Columns 173, 183, 193, 203 provide descriptions of the verbs.

The VIRTRAN language is compiled into byte codes. The verbs tend to be targeted for specific uses rather than being general. For example, there are six ways to look for an array of bytes. Instead, one or two simple, generic instructions could fill the same functionality. Preferably, a translator is used to translate from the VIRTRAN verbs to this simpler instruction set.

One preferred instruction set is based on the concept of a Discrete Finite Automation (DFA), a tool for text pattern matching. The machine begins with a pointer into the input stream and a start state. Based on what byte is found at the pointer, the machine moves to a specified state. For each transition, the pointer is moved forward to the next byte. The machine ends with a stop state that identifies which infection was identified or none. The DFA's for several viruses can be combined into a single DFA that scans for all viruses at the same time.

The resulting DFA is then translated into the instruction set byte codes. To simplify the scan engine interpreter, all 16-bit values are 2-byte aligned and 32-bit values are 4-byte aligned. Also values are in the correct byte order (big or little endian) for the target processor.

The instructions can be modeled after a stack based virtual machine. This helps reduce the number of bytes required to encode most instructions without adding complexity to the scan engine.

FIG. 15 is a table 210 listing several illustrative instructions. Column 211 sets forth the name of the instruction and column 212 provides descriptions of the instructions. FIG.

16 is a table 220 listing parameters (columns 222, 223, 224, 225) of the instructions (column 211) listed in the table of FIG. 15.

FIG. 17 is a table 230 listing additional instructions (column 231) and descriptions (column 232). As shown in the table 240 of FIG. 18, if there is a match 241, the pointer is moved to the next byte after the match and the given address 242 is called. After the call, a subsequent RET instruction (FIG. 26) will restore the pointer and continue execution after the MATCH.

FIG. 19 shows a table 250 describing the SKIM instruction. The pointer is moved through memory until the scanner finds a byte that matches one in the Byte array 252. For a match against Byte[i], the instruction at Address[i] 253 is called. After the call a subsequent RET instruction (FIG. 26) will restore the pointer and continue execution at the next instruction after the SKIM. SKIM is limited by byte Count bytes 254 before giving up.

FIG. 20 illustrates a table 260 describing the SEEK instruction. The distance to seek is popped from the stack. Seeking to the end of a file places the pointer just past the last byte. This is needed for defining regions that include the last byte of the file.

FIG. 21 depicts a table 270 describing the PUSH instruction. When a value is pushed onto the stack, it is automatically extended to a common integer size. Thus there is never a type problem using ADD (FIG. 23) and MULT (FIG. 24) with values pushed onto the stack.

FIG. 22 illustrates a table 280 describing the GOTO instruction. FIG. 23 depicts a table 290 describing the ADD instruction. FIG. 24 shows a table 300 describing the MULT instruction.

FIG. 25 illustrates a table 310 describing the CALL instruction. The address and pointer are restored by a RET instruction (FIG. 26).

FIG. 26 shows a table 320 describing the RET instruction. With reference to FIG. 26, if there are no more CALL instructions (FIG. 25), RET (FIG. 26) ends scanning. This is used to denote that no malware is detected and to either continue or end scanning.

FIG. 27 illustrates a table 330 describing the END instruction. FIG. 28 illustrates a table 340 describing the CRC instruction. The checksum 341 is computed from the current pointer to the address given on the stack. Multiple regions can be supplied by pushing the addresses on the stack.

Ex: pcheck 25ae b 29 167 16b 21c
  PUSH IMM 0xb
  PUSH IMM 0x29
  PUSH IMM 0x167
  PUSH IMM 0x16b
  PUSH IMM 0x21c
  CRC match 0x25ae 5

The following description describes cleaning. More instructions are needed to support common repairs. These can include the following abilities:

Delete the current item
  Kill the process
  Delete the file or record
  Interrupt the message with an error
Truncate the file (shrink)
Copy bytes from one location to another
  Fix up entry points for an infected program
Overwrite bytes in the stream.
Repair common XOR, ADD, and SUB encryptions Table 2 lists several VIRTRAN verbs that can be supported.

TABLE 2

1) read #
2) write #
3) shrink #
4) delete #
5) deletethefile
6) procrustes

FIGS. 29–32 illustrate tables 350, 360, 370, 380 listing several exemplary verbs that can be used during scanning. More particularly, FIG. 29 sets forth verbs (column 351) used to delete items. FIG. 30 lists truncate file verbs (column 361), FIG. 31 lists a copy byte verb (column 371) and FIG. 32 sets forth miscellaneous verbs (column 381).

The verbs listed in FIGS. 29–32 can be selected by counting the frequency for which each verb was used in DAT files for MICROSOFT WINDOWS. Columns 352, 362, 372, 382 each list illustrative percentages representing the frequency of verb occurrences in a DAT file for WINDOWS. Columns 353, 363, 373, 383 provide descriptions of the verbs.

FIG. 33 is a table 390 listing several illustrative instructions. Column 391 sets forth the name of the instruction and column 392 provides descriptions of the instructions.

FIG. 34 shows a table 400 describing the KILL instruction. If the current item is a process, then the process is killed (stopped). If the item is a file or record, it is deleted. For a message, the instruction interrupts sending or receiving the message. This is good about zeroing out the item before deleting.

The type value 401 helps verify that a mistake is not being made, such as where the KILL may have been intended to kill a process, but instead deletes a file.

FIG. 35 shows a table 410 describing the CHOP instruction. Chop removes the region between the pointer and the address provided on top of the stack. The pointer is moved to the nearest defined location in the file after the CHOP. The region is set to zero before being chopped. Note that MARK'ed locations may be invalid after a CHOP.

To shrink the file from the current pointer:
  PUSH PTR
  PUSH IMM 0
  SEEK EOF
  CHOP This can also support the DELSHR instruction.
  DELSHR 64 becomes:
  PUSH IMM 0
  PUSH IMM 64
  SEEK SET
  CHOP
  DELSHR—1 becomes:
  PUSH REG 1
  CHOP FIG. 36 shows a table 420 describing the COPY instruction. The pointer is left at the end of the copied bytes. The most common use is to copy 4 bytes for the entry point of the program back to the header. This is done by seeking to the 4 bytes, and doing the following:
  PUSH PTR
  PUSH IMM 4
  SEEK REL
  PUSH PTR
  PUSH IMM HEADER_LOCATION
  SEEK SET
  COPY FIG. 37 shows a table 430 describing the POP instruction. An 8 bit, 16 bit, or 32 bit value from the given register is stored to the pointer. To copy a 32-bit value from one address to another:

PUSH32
PUSH IMM OFFSET
SEEK REL
POP32

The file format can be in any suitable form. Elements of an illustrative file format are: file header, scan section, check section, and clean section. FIG. 38 depicts a table 440 setting forth elements of the file header, including preferred offset 441, number of bytes 442, and a description 443 of the items found in the header.

FIG. 39 shows a table 450 having elements of the name section of the file including preferred offset 451, number of bytes 452, and a description 453 of the items found in the name section.

The scan section includes a function for doing an initial scan of the selected file. If malware is discovered, the scan function will return the address within the name section for the item. This table entry provides the proper check function to verify the malware variant.

Figure 40:
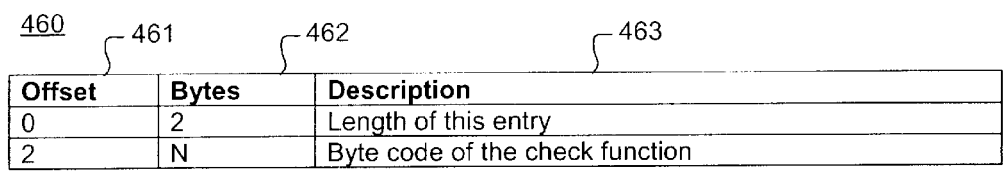
FIG. 40 depicts a table having elements of the check section of a file.

FIG. 40 depicts a table 460 having elements of the check section of the file including preferred offset 461, number of bytes 462, and a description 463 of the items found in the check section.

The check section contains a list of functions for identifying the specific malware variant once identified by the scan section. Each function returns an address into the name section identifying the specific malware detected or zero if the check fails. The name entry may specify the clean function to use to remove the malware. Note that many different check functions can be merged to reduce the file size if they are sufficiently similar.

Figure 41:
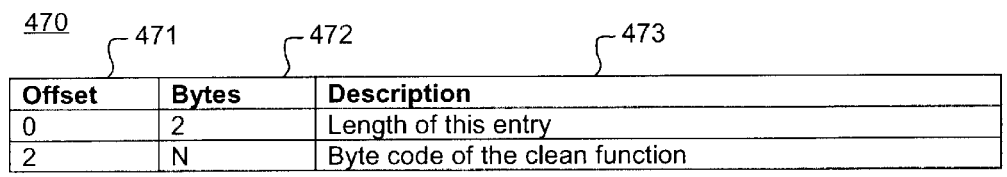
FIG. 41 depicts a table having elements of the check section of a file.

The clean section of the file includes a list of functions for cleaning the identified malware. FIG. 41 depicts a table 470 having elements of the check section of the file including preferred offset 471, number of bytes 472, and a description 473 of the items found in the check section. Note that the same clean function can be used to clean multiple detected malware.

While various embodiments have been described above, it should be understood that they have been presented by way of example only, and not limitation. For example, any of the network elements may employ any of the desired functionality set forth hereinabove. Further, any type of heuristic can be used in identifying suspicious content. Further, the list of techniques for releasing quarantined data should not be considered exhaustive. Thus, the breadth and scope of a preferred embodiment should not be limited by any of the above-described exemplary embodiments, but should be defined only in accordance with the following claims and their equivalents.

What is claimed is:

1. A method for programmable scanning for malicious content, comprising:
    (a) assembling an anti-virus program having an instruction set;
    (b) implementing the anti-virus program in a wireless client device; and
    (c) scanning for malicious code on the wireless client device utilizing the anti-virus program;
    (d) wherein the anti-virus program is assembled in a programmable computing language.

2. The method as recited in claim 1, wherein the instruction set in the programmable computing language is based on instructions from a pre-existing anti-virus program.

3. The method as recited in claim 2, wherein signature information of the pre-existing anti-virus program is merged into a single instruction in the programmable computing language.

4. The method as recited in claim 1, wherein the instruction set implements discrete function automation for signature matching.

5. The method as recited in claim 4, wherein discreet function automations for several types of malicious code are combined in a single discrete function automation for scanning for multiple types of malicious code simultaneously.

6. The method as recited in claim 1, wherein the wireless client device is selected from a group consisting of: a wireless telephone, a personal digital assistant, a handheld computer, and a pager.

7. The method as recited in claim 1, wherein the instruction set includes instructions for:
    (i) deleting an item;
    (ii) truncating a file;
    (iii) copying bytes from one location to another; and
    (iv) overwriting bytes in a stream.

8. The method as recited in claim 1, wherein the anti-virus program includes a signature file used to identify malicious code, wherein the signature file is compiled utilizing the programmable computing language.

9. The method as recited in claim 8, wherein the signature file includes:
    (i) an identifier uniquely identifying an instance of malicious code;
    (ii) a malicious code detection section comprising object code providing operations to detect the identified instance of malicious code in the wireless client device; and
    (iii) an extension sentence comprising object code providing reusable operations implemented in the programmable computing language.

10. A system for programmable scanning for malicious content, comprising:
    (a) a signature file compiled from computing language source code, the signature file being used to identify malicious code; and
    (b) an anti-virus engine assembled in a programmable computing language and implemented in a wireless environment, the anti-virus engine being for scanning for malicious code on a client device utilizing the signature file.

11. A computer program product for programmable scanning for malicious content, comprising:
    (a) computer code for assembling an anti-virus program having an instruction set, wherein the anti-virus program is assembled utilizing a programmable computing language;
    (b) computer code for implementing the anti-virus program in a wireless environment; and
    (c) computer code for scanning for malicious code on a client device utilizing the anti-virus program.

12. A method for programmable scanning for malicious content, comprising:
    (a) assembling an anti-virus engine written in a programmable computing language;
    (b) installing the anti-virus engine on a thin client device;
    (c) assembling a signature file in a programmable computing language, the signature file containing an identifier uniquely identifying a computer virus and a virus detection section comprising object code providing operations to detect the identified computer virus on the thin client device;

(d) installing the signature file on the thin client device;

(e) initiating the anti-virus engine for scanning for malicious code on the thin client device utilizing the signature file.

13. The method as recited in claim 12, further comprising adding to the signature file: an extension sentence comprising object code providing reusable operations implemented in the programmable computing language.

14. The method as recited in claim 12, wherein the anti-virus engine utilizes discrete function automation for pattern matching during scanning.

15. The method as recited in claim 14, wherein discrete function automations for several types of malicious code are combined in a single discrete function automation for scanning for multiple types of malicious code simultaneously.

16. The method as recited in claim 12, wherein the thin client device is selected from a group consisting of: a wireless telephone, a personal digital assistant, a handheld computer, and a pager.

17. The method as recited in claim 12, further comprising disabling malicious code detected during the scanning, wherein the malicious code is disabled by performing at least one of:

(i) deleting an item;

(ii) truncating a file;

(iii) copying bytes from one location to another; and (iv) overwriting bytes in a stream.

18. A method for programmable scanning for malicious content, comprising:

(a) assembling an anti-virus engine in a programmable computing language;

(b) installing the anti-virus engine on a wireless device;

(c) assembling a signature file using a programmable computing language, the signature file containing an identifier uniquely identifying a computer virus and a virus detection section comprising object code providing operations to detect the identified computer virus on the wireless device;

(d) installing the signature file on the wireless device; and (e) initiating the anti-virus engine for scanning for malicious code on the wireless device utilizing the signature file.

19. The method as recited in claim 18, further comprising adding to the signature file: an extension sentence comprising object code providing reusable operations implemented in the programmable computing language.

20. The method as recited in claim 18, wherein the anti-virus engine utilizes discrete function automation for pattern matching during scanning.

21. The method as recited in claim 20, wherein discrete function automations for several types of malicious code are combined in a single discrete function automation for scanning for multiple types of malicious code simultaneously.

22. The method as recited in claim 18, wherein the wireless device is selected from a group consisting of: a wireless telephone, a personal digital assistant, a handheld computer, and a pager.

23. The method as recited in claim 18, further comprising disabling malicious code detected during the scanning, wherein the malicious code is disabled by performing at least one of:

(i) deleting an item;

(ii) truncating a file;

(iii) copying bytes from one location to another; and (iv) overwriting bytes in a stream.

24. A method for programmable scanning for malicious content, comprising:

(a) assembling an anti-virus engine using a programmable computing language;

(b) installing the anti-virus engine on a thin client device;

(c) said thin client device being selected from a group consisting of: a wireless telephone, a personal digital assistant, a handheld computer, and a pager;

(d) assembling a signature file using a programmable computing language, the signature file containing an identifier uniquely identifying a computer virus and a virus detection section comprising object code providing operations to detect the identified computer virus on the thin client device;

(e) adding to the signature file: an extension sentence comprising object code providing reusable operations implemented in the programmable computing language;

(f) combining discrete function automations for several types of malicious code in a single discrete function automation for scanning for the types of malicious code simultaneously;

(g) installing the signature file on the thin client device;

(h) initiating the anti-virus engine for scanning for malicious code on a client device utilizing the signature file;

(i) said anti-virus engine utilizing discrete function automation for pattern matching during scanning; and (j) disabling malicious code detected during the scanning, wherein the malicious code is disabled by performing at least one of:

(i) deleting an item;

(ii) truncating a file;

(iii) copying bytes from one location to another; and (iv) overwriting bytes in a stream.

* * * * *

UNITED STATES PATENT AND TRADEMARK OFFICE
CERTIFICATE OF CORRECTION

PATENT NO. : 6,792,543 B2
APPLICATION NO. : 10/006413
DATED : September 14, 2004
INVENTOR(S) : Pak et al.

Page 1 of 1

It is certified that error appears in the above-identified patent and that said Letters Patent is hereby corrected as shown below:

Column 6, line 33 replace "(P/O)" with --(I/O)--;
Column 11, line 42 replace "programmnable" with --programmable--.

Signed and Sealed this
Fifteenth Day of February, 2011

David J. Kappos
*Director of the United States Patent and Trademark Office*